United States Patent
Lee et al.

(10) Patent No.: US 11,649,551 B2
(45) Date of Patent: May 16, 2023

(54) ASYMMETRIC ELECTROLYTE MEMBRANE, MEMBRANE ELECTRODE ASSEMBLY COMPRISING THE SAME, WATER ELECTROLYSIS APPARATUS COMPRISING THE SAME AND METHOD FOR MANUFACTURING THE SAME

(71) Applicant: KOREA INSTITUTE OF SCIENCE AND TECHNOLOGY, Seoul (KR)

(72) Inventors: So Young Lee, Seoul (KR); Hyoung-Juhn Kim, Seoul (KR); Sae Yane Baek, Seoul (KR); Taekyung Lee, Seoul (KR); Sung Jong Yoo, Seoul (KR); Jong Hyun Jang, Seoul (KR); Hee-Young Park, Seoul (KR); Jin Young Kim, Seoul (KR); Hyun S. Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/038,331

(22) Filed: Sep. 30, 2020

(65) Prior Publication Data
US 2021/0332486 A1    Oct. 28, 2021

(30) Foreign Application Priority Data

Apr. 28, 2020  (KR) .................. 10-2020-0051344

(51) Int. Cl.
*C25B 9/23* (2021.01)
*C25B 13/02* (2006.01)
(Continued)

(52) U.S. Cl.
CPC ............ *C25B 9/23* (2021.01); *B01D 67/0011* (2013.01); *B01D 67/0013* (2013.01);
(Continued)

(58) Field of Classification Search
CPC ....................................................... C25B 1/04
See application file for complete search history.

(56) References Cited

U.S. PATENT DOCUMENTS 4,124,458 A * 11/1978 Moeglich ............... C25B 13/04
                                                            204/252
5,180,750 A *  1/1993 Sugaya .................. C08G 75/23
                                                            521/30
(Continued)

FOREIGN PATENT DOCUMENTS

DE        b3143804 A  * 12/1982  .......... B01D 67/0011
JP     H02-269745 A  * 11/1990
(Continued)

OTHER PUBLICATIONS

Zhang et al, An integrally thin skinned asymmetric architecture design for advanced anion exchange membranes for vanadium flow batteries, Journal of Materials Chemistry A, vol. 3, No. 33, Jun. 2015, pp. 16948-16952 (Year: 2015).*

(Continued)

*Primary Examiner* — Harry D Wilkins, III
(74) *Attorney, Agent, or Firm* — Birch, Stewart, Kolasch & Birch, LLP

(57) ABSTRACT

The present disclosure discloses an asymmetric electrolyte membrane, a membrane electrode assembly including the same, a water electrolysis apparatus including the same and a method for manufacturing the same. More particularly, it discloses an asymmetric electrolyte membrane having a porous layer and a dense layer at the same time, a membrane electrode assembly including the same, a water electrolysis apparatus including the same and a method for manufacturing the same.

15 Claims, 15 Drawing Sheets

(51) Int. Cl.
*C25B 13/08* (2006.01)
*B01D 67/00* (2006.01)
*B01D 71/06* (2006.01)
*C25B 11/04* (2021.01)
*C25B 1/04* (2021.01)
*C25B 9/73* (2021.01)

(52) U.S. Cl.
CPC ............... *B01D 71/06* (2013.01); *C25B 1/04* (2013.01); *C25B 9/73* (2021.01); *C25B 11/04* (2013.01); *C25B 13/02* (2013.01); *C25B 13/08* (2013.01); *B01D 2325/023* (2013.01); *B01D 2325/42* (2013.01)

(56) References Cited

U.S. PATENT DOCUMENTS

| | | | | |
|---|---|---|---|---|
| 5,906,716 | A * | 5/1999 | Mertesdorf | H01M 8/1032 204/252 |
| 6,602,630 | B1 * | 8/2003 | Gopal | H01M 8/1081 429/304 |
| 2002/0127474 | A1 * | 9/2002 | Fleischer | B01D 69/10 429/316 |
| 2003/0232184 | A1 * | 12/2003 | Morikawa | H01M 50/417 428/305.5 |
| 2012/0031772 | A1 * | 2/2012 | Dean | C25B 9/73 205/637 |
| 2013/0323496 | A1 | 12/2013 | Henkensmeier et al. | |
| 2016/0204459 | A1 * | 7/2016 | Henkensmeier | H01M 8/1023 521/27 |
| 2016/0312371 | A1 * | 10/2016 | Kamei | C25B 9/73 |
| 2020/0181785 | A1 | 6/2020 | Mues | |

FOREIGN PATENT DOCUMENTS

| | | |
|---|---|---|
| JP | 2005-235466 A | 9/2005 |
| JP | 2019-83085 A | 5/2019 |
| KR | 10-2004-0043877 A | 5/2004 |
| KR | 10-1358940 B1 | 2/2014 |
| KR | 10-1950703 B1 | 2/2019 |
| KR | 10-2018323 B1 | 9/2019 |
| KR | 10-2020-0018588 A | 2/2020 |
| WO | WO 03/065481 * | 8/2003 .......... H01M 50/403 |
| WO | WO 2016/096806 A1 * | 6/2016 ............ C25B 11/04 |

OTHER PUBLICATIONS

Zhang et al., Supporting Information for An integrally thin skinned asymmetric architecture design for advanced anion exchange membranes for vanadium flow batteries, Journal of Materials Chemistry A, vol. 3, No. 33, Jun. 2015, pp. 1-14 (Year: 2015).*
Zschocke et al, Novel Ion Exchange Membranes Based on an Aromatic Polyethersulfone, Journal of Membrane Science, vol. 22, No. 2-3, Feb. 1985, pp. 325-332 (Year: 1985).*
Hagesteijn et al, A review of the synthesis and characterization of anion exchange membranes, Journal of Material Science, vol. 53, May 2018, pp. 11131-11150 (Year: 2018).*
Bender et al., "Initial approaches in benchmarking and round robin testing for proton exchange membrane water electrolyzers", International Journal of Hydrogen Energy, 2019, vol. 44, pp. 9174-9187.
Faustini et al., "Hierarchically Structured Ultraporous iridium-Based Materials—A Novel Catalyst Architecture for Proton Exchange Membrane Water Electrolyzers", Adv. Energy Mater., 2019, vol. 9, No. 1802136, total 11 pages.
Henkensmeier et al., "ortho-Dichlorobenzene as a pore modifier for PEMFC catalyst electrodes and dense Nafion membranes with one porous surface", J. Mater. Chem., 2012, vol. 22, pp. 14602-14607.
Kumar et al., "Hydrogen production by PEM water electrolysis—A review", Materials Science for Energy Technologies, 2019, No. 2, pp. 442-454.
Kwon et al., "The effect of adjusting the hydrophilic-hydrophobic block length in densely sulfonated poly(fluorenyl ether sulfone) block copolymer membranes", International Journal of Hydrogen Energy, 2017, vol. 42, pp. 11845-11856.
Park et al., "Ultra-low loading of $IrO_2$ with an inverse-opal structure in a polymer-exchange membrane water electrolysis", Nano Energy, 2019, vol. 58, pp. 158-166.

* cited by examiner

- Water & alcohols concentration ↓
- Ortho-dichlorobenzene droplets (●)
- Solutions density ↑

ASYMMETRIC ELECTROLYTE MEMBRANE, MEMBRANE ELECTRODE ASSEMBLY COMPRISING THE SAME, WATER ELECTROLYSIS APPARATUS COMPRISING THE SAME AND METHOD FOR MANUFACTURING THE SAME

CROSS-REFERENCE TO RELATED APPLICATION

This application claims the priority of Korean Patent Application No. 10-2020-0051344 filed on Apr. 28, 2020, and all the benefits accruing therefrom under 35 U.S.C. § 119, the contents of which in its entirety are herein incorporated by reference.

TECHNICAL FIELD

Description of Government-Sponsored Research and Development

This research was supported by the Hydrogen Energy Innovation Technology Development Program of the National Research Foundation of Korea (NRF) funded by the Korean government (Ministry of Science and ICT(MSIT)) (No. 2019M3E6A1063674).

This research was supported by the Material and Parts Technology Development Project of the Korea Institute of Industrial Technology Evaluation and Planning (No. 20010955).

The present disclosure relates to an asymmetric electrolyte membrane, a membrane electrode assembly including the same, a water electrolysis apparatus including the same and a method for manufacturing the same. More particularly, it relates to an asymmetric electrolyte membrane having a porous layer and a dense layer at the same time, a membrane electrode assembly including the same, a water electrolysis apparatus including the same and a method for manufacturing the same.

BACKGROUND ART

At present, a perfluorosulfonic acid (PFSA) membrane is mainly used as an electrolyte membrane for a proton exchange membrane (PEM) fuel cell and in water electrolysis. The most representative commercially available membrane is DuPont's Nafion®. Among Nafion® electrolyte membranes, 117 and 115 single membranes are the most widely used in water electrolysis.

Recently, researches are being conducted actively not only on PEM water electrolysis but also on anion exchange electrolyte membrane (AEM) water electrolysis. Although AEM water electrolysis is drawing a lot of attentions in that it can lower the cost of electrolyte membrane and catalyst used in the existing PEM water electrolysis while making up for the shortcomings of the traditional alkaline water electrolysis (AWE), the research on AEM water electrolysis is still in the early stage. At present, a phenylene-based hydrocarbon electrolyte membrane is being developed as an AEM electrolyte membrane with thermal and chemical durability.

The Nafion® 117 single membrane used for PEM water electrolysis has a thickness of about 180 µm, which is larger than that of other electrolyte membranes, Nafion® 115 (130 µm) and 212 Nafion® (50 µm). Although Nafion® 117 has improved physical and chemical durability due to the large thickness, the water electrolysis performance of a membrane electrode assembly consisting of an electrolyte membrane, a catalyst layer, a gas diffusion layer, etc. is decreased if the thickness is increased due to increased ohmic resistance and mass transfer resistance.

In addition, the anion exchange electrolyte membrane is limited in that mass transfer resistance is large because ion conductivity is significantly lower as compared to a cation exchange membrane and the transfer rate of hydroxide ($OH^-$) ion or other species is slow.

In order to solve this problem, researches have been carried out actively on the technologies of changing the catalyst and electrode structure constituting a membrane electrode assembly or reducing ohmic resistance and mass transfer resistance by introducing a porous structure. However, they are limited in terms of large-scale production and cost for commercialization. Therefore, there is a need for a technology of reducing mass transfer resistance by introducing a porous structure to a polymer electrolyte membrane and improving water electrolysis performance by increasing the discharge rate of a gas produced through water electrolysis reaction.

DISCLOSURE

Technical Problem

The present disclosure is directed to providing an asymmetric electrolyte membrane for a water electrolysis apparatus, wherein catalyst loss caused by separation of an electrolyte membrane and a catalyst layer is decreased, interfacial area is increased by a porous layer of the asymmetric membrane and the efficiency of water transfer at the interface between a gas and the electrolyte membrane is increased.

Technical Solution

In an exemplary embodiment of the present disclosure, provided is an asymmetric electrolyte membrane for a water electrolysis apparatus, which includes: a porous layer including a fluorine-based cation-exchange resin or a hydrocarbon-based anion-exchange resin; and a dense layer including a fluorine-based cation-exchange resin or a hydrocarbon-based anion-exchange resin, wherein the porous layer includes pores.

In another exemplary embodiment of the present disclosure, provided is a membrane electrode assembly for a water electrolysis apparatus, which includes: an anode; a cathode; and the asymmetric electrolyte membrane for a water electrolysis apparatus described above, which is located between the anode and the cathode.

In another exemplary embodiment of the present disclosure, provided is a water electrolysis apparatus including the membrane electrode assembly for a water electrolysis apparatus described above.

In another exemplary embodiment of the present disclosure, provided is a method for manufacturing the asymmetric electrolyte membrane for a water electrolysis apparatus described above, which includes: a step of coating a casting solution including a fluorine-based cation-exchange resin or a hydrocarbon-based anion-exchange resin, a solvent and a nonsolvent on a substrate; a step of removing a solvent from a cast membrane; and a step of removing the nonsolvent from the membrane with the solvent removed.

In another exemplary embodiment of the present disclosure, provided is a method for manufacturing an asymmetric electrolyte membrane for a water electrolysis apparatus, which includes: a step of coating a first casting solution including a hydrocarbon-based anion-exchange resin and a solvent on a substrate; a step of forming a dense layer by removing the solvent from a cast membrane; a step of coating a second casting solution including a hydrocarbon-based anion-exchange resin and a solvent on the dense layer; and a step of forming a porous layer by immersing the membrane with the second casting solution coated in a nonsolvent.

In another exemplary embodiment of the present disclosure, provided is a method for manufacturing a membrane electrode assembly for a water electrolysis apparatus, which includes: a step of manufacturing an asymmetric electrolyte membrane for a water electrolysis apparatus according to the method described above; a step of forming an anode on a porous layer of the asymmetric electrolyte membrane for a water electrolysis apparatus; and a step of forming a cathode on a dense layer of the asymmetric electrolyte membrane for a water electrolysis apparatus.

Advantageous Effects

An asymmetric electrolyte membrane disclosed in the present disclosure can decrease catalyst loss due to separation of an electrolyte membrane and a catalyst layer that may occur during water electrolysis cycles, can increase interfacial area due to a porous layer of the asymmetric membrane and can increase the efficiency of water and ion transfer at the interface between a gas and the electrolyte membrane.

In addition, by disposing the porous layer of the asymmetric membrane toward an anode where oxygen evolution reaction occurs, the performance of water electrolysis can be improved over a single membrane by allowing effective discharge of a gas produced by water electrolysis reaction and reducing mass transfer resistance at the interface between the anode catalyst layer and the electrolyte membrane.

BEST MODE

Hereinafter, specific exemplary embodiments of the present disclosure will be described in detail referring to the attached drawings.

The exemplary embodiments of the present disclosure described herein are provided only for illustrative purposes. The exemplary embodiments of the present disclosure may be embodied in various forms and should not be interpreted as being limited to the exemplary embodiments described in the present specification.

The present disclosure can be changed variously and may have various forms. It should be understood that the exemplary embodiments are not intended to limit the present disclosure to specific forms and include all modifications, equivalents and substitutes included in the technical idea and scope of the present disclosure.

In the present disclosure, when a certain portion is described to "comprise" a certain element, it means that other elements may be further included unless expressly indicated otherwise.

Asymmetric Electrolyte Membrane for Water Electrolysis Apparatus

An exemplary embodiment of the present disclosure provide an asymmetric electrolyte membrane for a water electrolysis apparatus, which includes: a porous layer including a fluorine-based cation-exchange resin or a hydrocarbon-based anion-exchange resin; and a dense layer including a fluorine-based cation-exchange resin or a hydrocarbon-based anion-exchange resin, wherein the porous layer includes pores.

Figure 1:
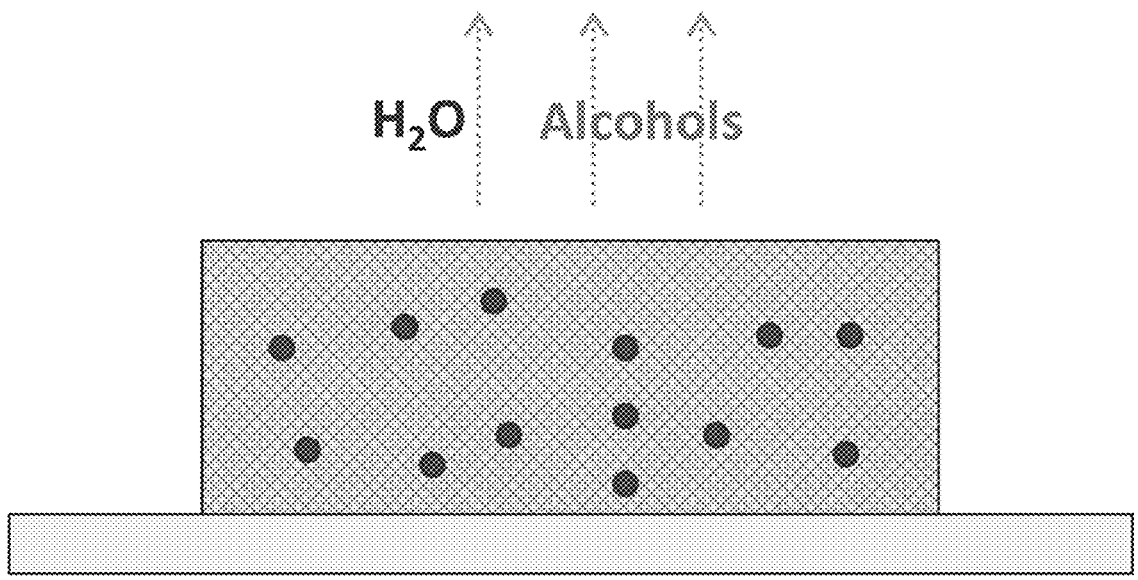
FIG. 1 schematically shows a process of manufacturing a PEM asymmetric electrolyte membrane for a water electrolysis apparatus according to an exemplary embodiment of the present disclosure.

Referring to FIG. 1, the asymmetric electrolyte membrane for a water electrolysis apparatus is an asymmetric electrolyte membrane having a porous layer and a dense layer with few pores at the same time. When an anode catalyst is provided on the porous layer or toward the porous layer, catalyst loss caused by separation of the electrolyte membrane and a catalyst layer that may occur during water electrolysis cycles due to inclusion of the catalyst into the electrolyte membrane of the porous layer and consequent membrane-catalyst anchoring may be decreased.

In addition, interfacial area may be increased by the porous layer and the efficiency of water transfer at the interface between a gas and the electrolyte membrane may be increased. The biggest reason why the porous layer and the dense layer are provided at the same time is because of gas permeation property. If a polymer electrolyte membrane is formed only with a porous layer, the membrane and electrode may be degraded due to high hydrogen and oxygen permeability. Therefore, it is preferred that a porous layer and a dense layer are provided at the same time.

Figure 2:
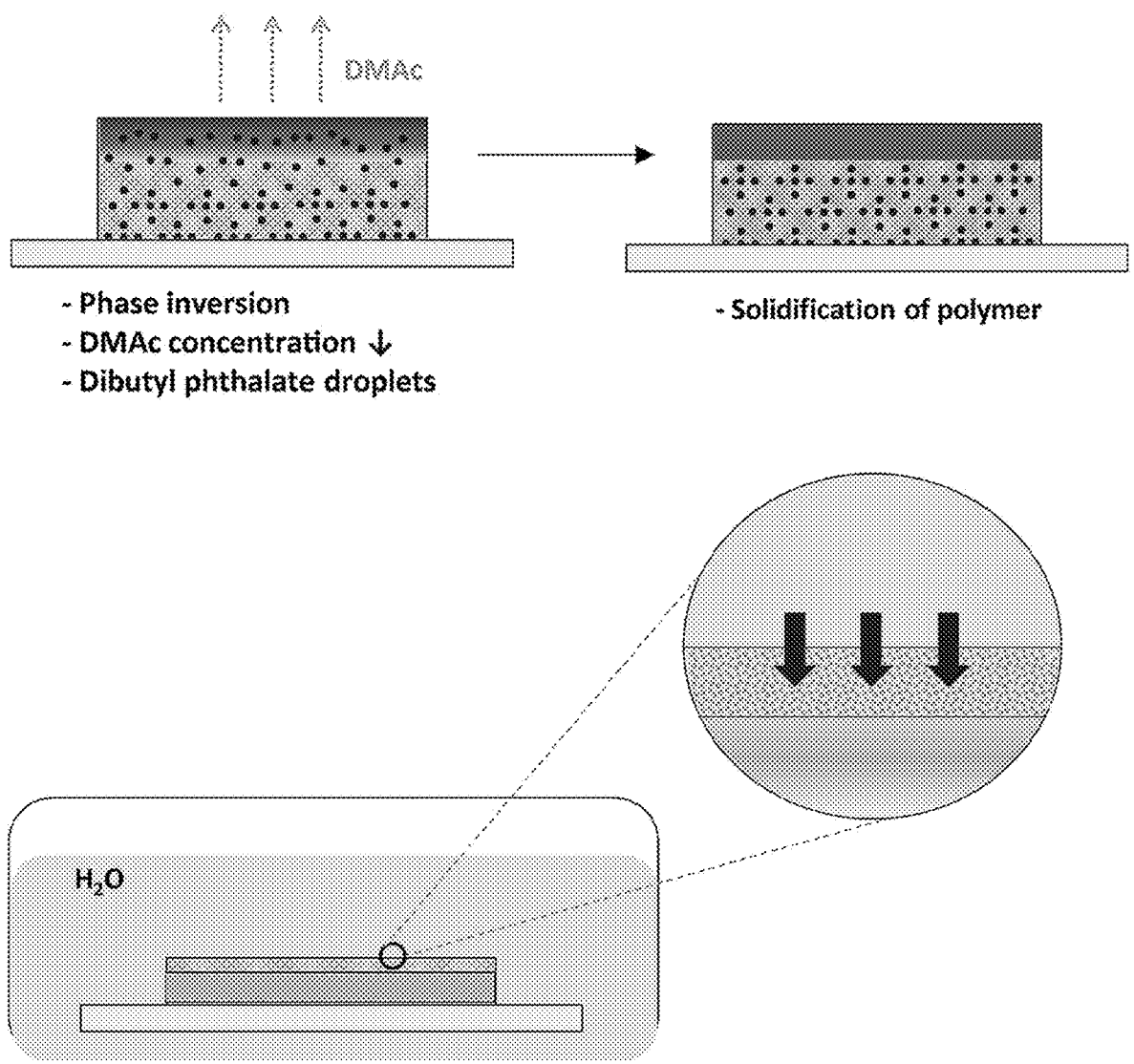
FIG. 2 schematically shows a process of manufacturing an AEM asymmetric electrolyte membrane for a water electrolysis apparatus according to an exemplary embodiment of the present disclosure.

In an exemplary embodiment, the porous layer may have a porosity of 60-80%. As seen from FIG. 1 or FIG. 2, pores are hardly formed in the dense layer due to phase separation caused by the density difference of a nonsolvent and a polymer in a manufacturing process as described below. As a result, the dense layer may have, e.g., a sub-angstrom (Å) pore size such that only ions can pass therethrough.

In an exemplary embodiment, the porous layer may have a pore size of 0.5-20 μm. For example, the porous layer of a PEM asymmetric electrolyte membrane for a water electrolysis apparatus may have a pore size of 1-15 μm, specifically 5-10 μm, and the porous layer of an AEM asymmetric electrolyte membrane for a water electrolysis apparatus may have a pore size of 1-15 μm, specifically 5-10 μm.

If the pore size is smaller than 0.5 μm, the mass transfer of a gas produced through water electrolysis reaction may be interfered, which may cause increased resistance and decreased performance. If the pore size exceeds 20 μm, water electrolysis durability may decrease as crossover caused by the permeation of a gas produced through water electrolysis reaction is accelerated.

In an exemplary embodiment, the dense layer may not include pores or only ions can pass therethrough.

In an exemplary embodiment, the fluorine-based cation-exchange resin may be one or more selected from a group consisting of Nafion®, Fumapem®, Flemion® and Aciplex® of a long-side-chain structure and Aquivion of a short-side-chain structure. Specifically, Nafion® with an EW value of 1000 may be used. And, the hydrocarbon-based anion-exchange resin may be one or more selected from a group consisting of a phenylene-based resin, a PBI (polybenzimidazole)-based resin, a PES (polyaryleneethersulfone)-based resin, a PPO (polyphenylene oxide)-based resin, a PS polystyrene-based resin and a blend thereof In an exemplary embodiment, the hydrocarbon-based anion-exchange resin may be one or more selected from a group consisting of polymer poly(biphenyl alkylene), poly (terphenyl alkylene) and polybenzimidazole having a thermally, chemically and mechanically stable biphenyl or terphenyl structure, specifically a polymer having a meta-polyterphenyl structure such as bromotrimethyl(7,7,7-trifluoro-6-methyl-6-4'''-methyl-[1,1':3',1'-terphenyl]-4-yl) heptyl-$\lambda^5$-azane (mTPN1).

In an exemplary embodiment, the asymmetric electrolyte membrane for a water electrolysis apparatus may be one treated with one or more selected from a group consisting of an acid, hydrogen peroxide and a base. For example, an electrolyte membrane for PEM water electrolysis may be one immersed in hydrochloric acid and then washed with deionized water to remove impurities and $Na^+$ of sodium sulfonate salt is substituted and changed to the form of $SO_3H$ having $H^+$ ion, and an electrolyte membrane for AEM water electrolysis may be one immersed in potassium hydroxide to substitute Bf of the bromide salt of the polymer, resulting one having $OH^-$ ion.

In an exemplary embodiment, the asymmetric electrolyte membrane for a water electrolysis apparatus may be for a PEM water electrolysis apparatus or for an AEM water electrolysis apparatus.

Another exemplary embodiment of the present disclosure provides a membrane electrode assembly for a water electrolysis apparatus, which includes: an anode; a cathode; and the asymmetric electrolyte membrane for a water electrolysis apparatus described above, which is located between the anode and the cathode.

Figure 3:
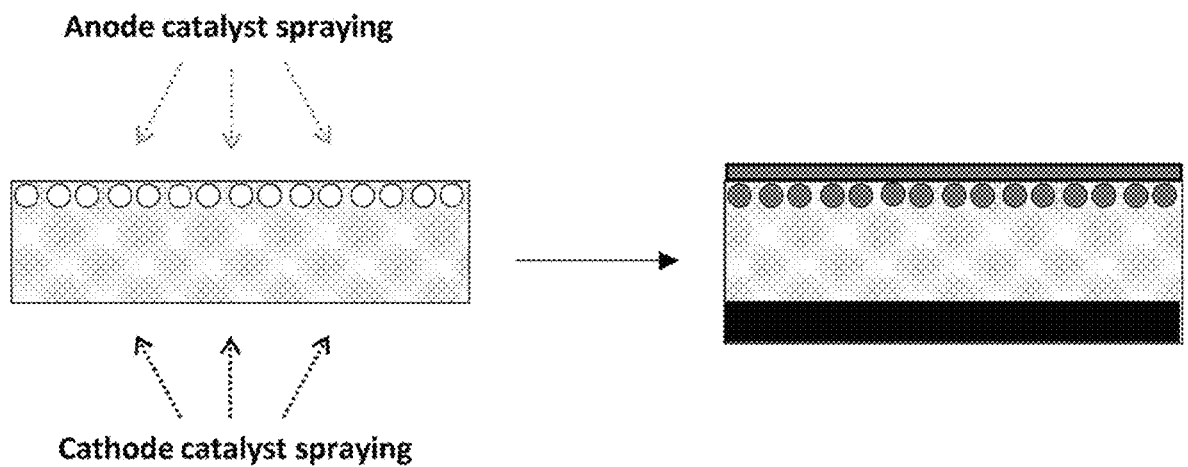
FIG. 3 schematically shows a process of forming a catalyst layer in the PEM asymmetric electrolyte membrane for a water electrolysis apparatus of FIG. 1.
Figure 4:
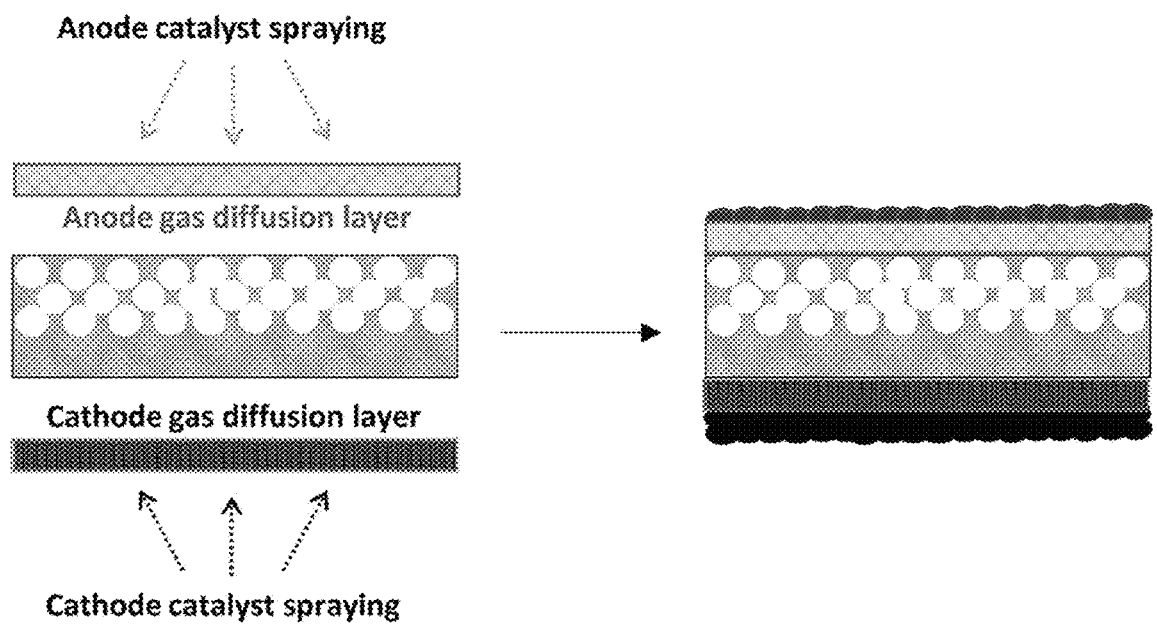
FIG. 4 schematically shows a process of forming a catalyst layer in the AEM asymmetric electrolyte membrane for a water electrolysis apparatus of FIG. 2.

In an exemplary embodiment, the anode may be provide on the porous layer, and the cathode may be provide on the dense layer. The anode or the cathode may be a gas diffusion layer coated with an anode catalyst or a gas diffusion layer coated with a cathode catalyst. Referring to FIG. 3 and FIG. 4, by disposing the porous layer of the asymmetric membrane toward the anode where oxygen evolution reaction, which is a rate-determining step of water electrolysis, occurs, the performance of water electrolysis can be improved over a common single membrane including a fluorine-based cation-exchange resin or a hydrocarbon-based anion-exchange resin by allowing effective discharge of oxygen produced by water electrolysis reaction and reducing mass transfer resistance at the interface between the anode catalyst layer and the electrolyte membrane.

In an exemplary embodiment, the anode may include one or more selected from a group consisting of a precious metal (e.g., Ir, Ru, Pt, etc.)-based single oxide, a precious metal-based complex oxide and a transition metal, and the cathode may include one or more selected from a group consisting of a precious metal-based carbon support such as Pt/C, Ir—Pt/C, etc. and a transition metal.

For example, the anode may include a porous metallic material such as titanium paper, titanium felt, titanium mesh or titanium-coated stainless felt, and the cathode may include a porous carbon material such as carbon paper, carbon felt, carbon cloth, carbon fiber, etc.

Figure 7:
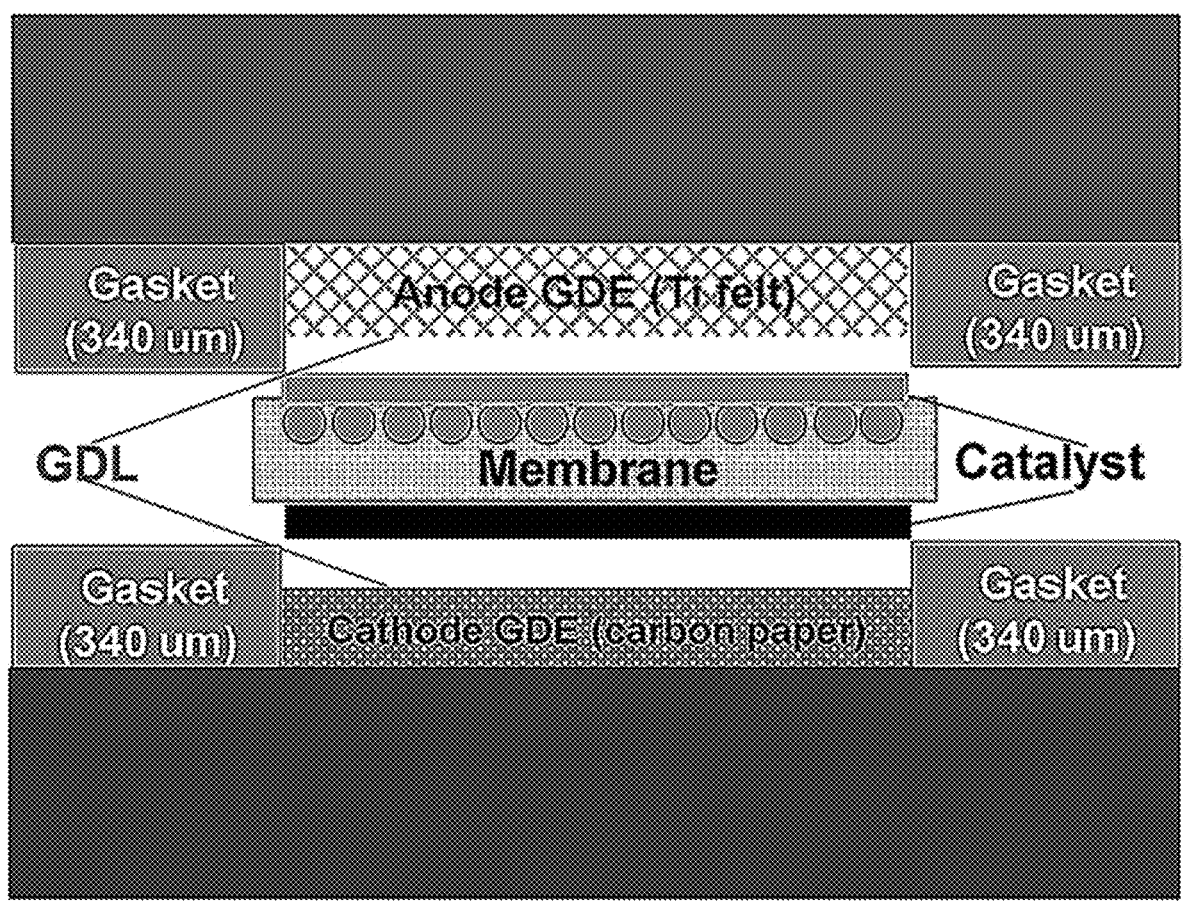
FIG. 7 schematically shows the structure of a membrane electrode assembly including a PEM asymmetric electrolyte membrane for a water electrolysis apparatus manufactured in an exemplary embodiment of the present disclosure.
Figure 8:
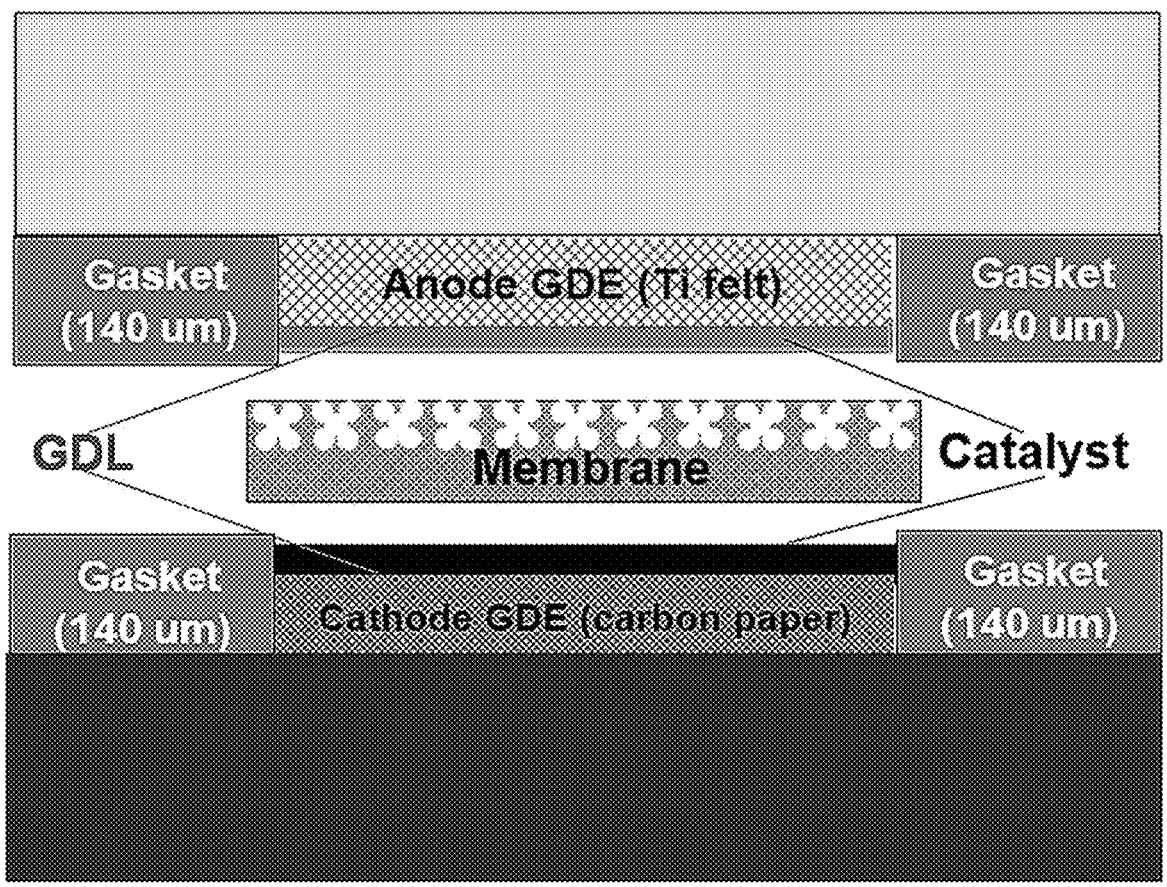
FIG. 8 schematically shows the structure of a membrane electrode assembly including an AEM asymmetric electrolyte membrane for a water electrolysis apparatus manufactured in an exemplary embodiment of the present disclosure.

Another exemplary embodiment of the present disclosure provides a water electrolysis apparatus including the membrane electrode assembly for a water electrolysis apparatus described above (see FIG. 7, FIG. 8 and FIGS. 13A and 13B). In addition, the water electrolysis apparatus may further include a device capable of pressure setting and a device capable of investigating crossover of a gas produced through water electrolysis reaction by working together with a GC system and a gas sensor, in addition to the components shown in FIGS. 7 and 8.

Method for Manufacturing Asymmetric Electrolyte Membrane for Water Electrolysis Apparatus An exemplary embodiment of the present disclosure provides a method for manufacturing the asymmetric electrolyte membrane for a water electrolysis apparatus described above, which includes: a step of coating a casting solution including a fluorine-based cation-exchange resin or a hydrocarbon-based anion-exchange resin, a solvent and a nonsolvent on a substrate; a step of removing a solvent from a cast membrane; and a step of removing the nonsolvent from the membrane with the solvent removed.

According to an exemplary embodiment of the present disclosure, phase separation occurs between the nonsolvent having a high melting point and a dispersion including the fluorine-based cation-exchange resin or the hydrocarbon-based anion-exchange resin due to evaporation of the solvent during the manufacturing of the electrolyte membrane and pores are formed in a layer that has been occupied by the nonsolvent as the nonsolvent floats toward the surface. As a result, a porous layer with a plurality of pores formed is formed on the surface (or upper part) of the cast membrane, and a dense layer with almost no pores is formed in the lower part.

In an exemplary embodiment, the method may be a method for manufacturing an asymmetric electrolyte membrane for a PEM water electrolysis apparatus, the solvent may be one or more selected from a group consisting of water, methanol, ethanol and propanol, and the nonsolvent may be one or more selected from a group consisting of ortho-dichlorobenzene, meta-dichlorobenzene, para-dichlorobenzene, naphthalene and alpha-naphthol. Specifically, the solvent may be water, ethanol or 1-propanol, and the nonsolvent may be ortho-dichlorobenzene.

In an exemplary embodiment of the present disclosure, when the method is a method for manufacturing an asymmetric electrolyte membrane for a PEM water electrolysis apparatus, since the melting point of the nonsolvent, which is approximately 178-180° C., is about 100° C. higher than that of water (100° C.), ethanol (78° C.) or 1-propanol (97° C.) used as the solvent during the manufacturing of the electrolyte membrane, a porous layer of the asymmetric electrolyte membrane may be prepared by evaporating the solvent with a lower melting point first and then forming pores as the nonsolvent is evaporated.

The nonsolvent does not interfere with the dissolution of the fluorine-based cation-exchange resin since it does not greatly change the dielectric constant of the dispersion. For example, since ortho-dichlorobenzene has a dielectric constant of 9.93, its addition changes the dielectric constant of the casting solution including the fluorine-based cation-exchange resin slightly from 46 to 38. Therefore, the fluorine-based cation-exchange resin such as Nation® can be dissolved in the casting solution.

In an exemplary embodiment, the method may be a method for manufacturing an asymmetric electrolyte membrane for an AEM water electrolysis apparatus, the solvent may be one or more selected from a group consisting of dimethylformamide, dimethylacetamide, dimethyl sulfoxide and methylpyrrolidone, and the nonsolvent may be one or more selected from a group consisting of polyethylene glycol, polyvinylpyrrolidone, stearyl alcohol, bean oil, glycerol and dibutyl phthalate. Specifically, the solvent may be dimethylacetamide, and the nonsolvent may be dibutyl phthalate.

In an exemplary embodiment of the present disclosure, when the method is a method for manufacturing an asymmetric electrolyte membrane for an AEM water electrolysis apparatus, since the melting point of the nonsolvent, which is approximately 340° C., is about 138-175° C. higher than that of dimethylformamide (152-154° C.), dimethylacetamide (165° C.), dimethyl sulfoxide (189° C.) or methylpyrrolidone (202° C.) used as the solvent during the manufacturing of the electrolyte membrane, the solvent with a lower melting point may be evaporated first and then the nonsolvent may be leached by immersing the dried anion exchange electrolyte membrane in an extraction solvent such as methanol, ethanol, butanol and hexane.

For example, the step of removing the solvent may be carried out by evaporation. In addition, for the method for manufacturing an asymmetric electrolyte membrane for a PEM water electrolysis apparatus, the step of removing the nonsolvent may be carried out by evaporating the nonsolvent as described above. For the method for manufacturing an asymmetric electrolyte membrane for an AEM water electrolysis apparatus, the nonsolvent may be removed by immersing the membrane with the solvent removed in an extraction solvent for extracting the nonsolvent such as methanol, ethanol, butanol and hexane.

In an exemplary embodiment, the method may further include, after the step of removing the nonsolvent, a step of treating the membrane with one or more selected from a group consisting of an acid, hydrogen peroxide and a base.

In an exemplary embodiment, a step of further drying the membrane after evaporation may be performed at 60-120° C.

In an exemplary embodiment, the method may further include, after the step of further drying the membrane, treating the membrane with one or more selected from a group consisting of an acid, hydrogen peroxide and a base. For example, in an exemplary embodiment of the present disclosure, for the method for manufacturing an asymmetric electrolyte membrane for a PEM water electrolysis apparatus, the membrane may be one immersed in hydrochloric acid and then washed with deionized water to remove impurities and substitute $Na^+$ of sodium sulfonate salt with $H^+$ ion. And, for the method for manufacturing an asymmetric electrolyte membrane for an AEM water electrolysis apparatus according to an exemplary embodiment of the present disclosure, the membrane may be one immersed in potassium hydroxide and then washed with deionized water to remove impurities and substitute Bf of trimethylamine bromide salt with $OH^-$ ion.

An exemplary embodiment of the present disclosure provides a method for manufacturing the asymmetric electrolyte membrane for a water electrolysis apparatus described above, which includes: a step of coating a first casting solution including a hydrocarbon-based anion-exchange resin and a solvent on a substrate; a step of forming a dense layer by removing the solvent from a cast membrane; a step of coating a second casting solution including a hydrocarbon-based anion-exchange resin and a solvent on the dense layer; and a step of forming a porous layer by immersing the membrane with the second casting solution coated in a nonsolvent.

According to an exemplary embodiment of the present disclosure, an asymmetric electrolyte membrane for an AEM water electrolysis may be manufactured by using the phase transition of a polymer solution caused by diffusion of a nonsolvent such as water or an alcohol, by forming a dense layer first by coating a first casting solution including a hydrocarbon-based anion-exchange resin at a relatively higher content as compared to a second casting solution, coating a second casting solution including the hydrocarbon-based anion-exchange resin at a relatively higher content as compared to the first casting solution on the dense layer, and then immersing the same in an excess amount of a nonsolvent maintained at room temperature or below.

In an exemplary embodiment, a ratio of the concentration of the first casting solution and the concentration of the second casting solution may be 1:0.1-0.9, for example, 1:0.4-0.6.

The factors affecting the thickness and porosity of the porous layer include the kind and content of the polymer/casting solvent, the time period of immersion in water after the casting, etc. For example, the time period of immersion in the nonsolvent (phase transition time) may be at least 12 hours.

In an exemplary embodiment, the method may be a method for manufacturing an asymmetric electrolyte membrane for an AEM water electrolysis apparatus, the solvent may be one or more selected from a group consisting of dimethylformamide, dimethylacetamide, dimethyl sulfoxide and methylpyrrolidone, and the nonsolvent may be one or more selected from a group consisting of water, alcohol, polyvinylpyrrolidone, polyethylene glycol and glycerol. For example, the alcohol may be one or more selected from a group consisting of ethyl alcohol, methyl alcohol, 1-propanol and isopropyl alcohol (2-propanol). Specifically, the solvent may be dimethylacetamide, and the nonsolvent may be water or an alcohol.

An exemplary embodiment of the present disclosure provides a method for manufacturing a membrane electrode assembly for a water electrolysis apparatus, which includes: a step of manufacturing an asymmetric electrolyte membrane for a water electrolysis apparatus according to the method described above; a step of forming (or disposing) an anode on a porous layer of the asymmetric electrolyte membrane for a water electrolysis apparatus; and a step of forming (or disposing) a cathode on a dense layer of the asymmetric electrolyte membrane for a water electrolysis apparatus.

Referring to FIG. 3, FIG. 4 and FIG. 13, it can be seen that, by forming and disposing a catalyst on or toward a porous layer, the transfer of an electrolyte injected to water electrolysis apparatus and the discharge of produced hydrogen gas can be improved and mass transfer resistance can be reduced by allowing easy contact of the electrolyte membrane and the catalyst constituting the membrane electrode assembly.

In an exemplary embodiment, each of the step of forming the anode and the step of forming the cathode may be carried out by spray coating. Spray coating is advantageous in that the cost of equipment and manufacturing is low and the manufacturing process is simple as compared to electroplating.

Hereinafter, the present disclosure is described in detail through examples. However, the examples are only for illustrating the present disclosure and the scope of the present disclosure is not limited by them.

EXAMPLE

Preparation of Asymmetric Membrane for PEM Water Electrolysis

Specifically, a uniform mixture casting solution was prepared by adding 180 mg of ortho-dichlorobenzene to 1 mL of a Nafion® dispersion (D2020 with an EW value of 1000 was dried with a resin and then dissolved in a solvent) and then stirring for 24 hours. 180 mg of ortho-dichlorobenzene was added to 1 mL of the Nafion® dispersion [10 wt. % Nafion®, 90 wt. % solvent; solvent=20 wt. % water+80 wt. % alcohol (ethanol/1-propanol=1:1 (wt./wt.))].

Then, the casting solution was coated on a glass substrate using a doctor blade. After the casting solution was cast on the glass substrate, the solvent was evaporated at 30° C. for 24 hours. Specifically, after pouring the casting solution thinly onto a thin glass substrate on a hot plate set to 30-60° C., the solvent was evaporated slowly for over 20 hours. As a result of the solvent evaporation, phase separation occurred between the Nafion® dispersion and the nonsolvent and the nonsolvent, ortho-dichlorobenzene, floated onto the surface of the membrane before the Nafion® was solidified due to increased density of the dispersion (see FIG. 1). Through this procedure, a Nafion® asymmetric electrolyte membrane having a porous layer on the surface and a dense layer with no pores in the lower part was prepared. In order to remove the remaining ortho-dichlorobenzene, the membrane was dried additionally at 60° C. for 12 hours, at 100° C. in vacuo for 2 hours, and at 120° C. in vacuo for 2 hours. If the asymmetric membrane is heated abruptly from 60° C. to 120° C. under the reduced-pressure condition to remove the nonsolvent constituting the porous layer, foaming and cracking may occur on the surface. Accordingly, an asymmetric membrane with a uniform surface can be obtained by slowly evaporating the nonsolvent as described above.

For a re-casting membrane, casting and solvent evaporation were conducted under the same condition as the asymmetric membrane. The re-casting membrane was prepared in the same manner as the asymmetric membrane without using the pore-forming additive, ortho-dichlorobenzene. Also, Nafion® 117 was purchased and prepared as a commercially available membrane.

As a result of observing the finally prepared electrolyte membranes, the Nafion® 117 single membrane and the re-casting membrane were transparent whereas the asymmetric membrane of the present disclosure looked whitish and opaque. The opaque membrane seems to be due to the formation of the porous layer.

Pretreatment of Electrolyte Membrane for PEM Water Electrolysis

The commercially available Nafion® 117 membrane, the Nafion® re-casting membrane and the asymmetric membrane were treated with an acid under the same condition. The electrolyte membrane was immersed in a 2 M HCl aqueous solution for at least 12 hours and then washed with deionized water to remove impurities and $Na^+$ of sodium sulfonate salt is substituted and changed to the form of $SO_3H$ having $H^+$ ion. After the washing with deionized water, the water was removed by drying in an oven at 60° C.

Figure 5A:
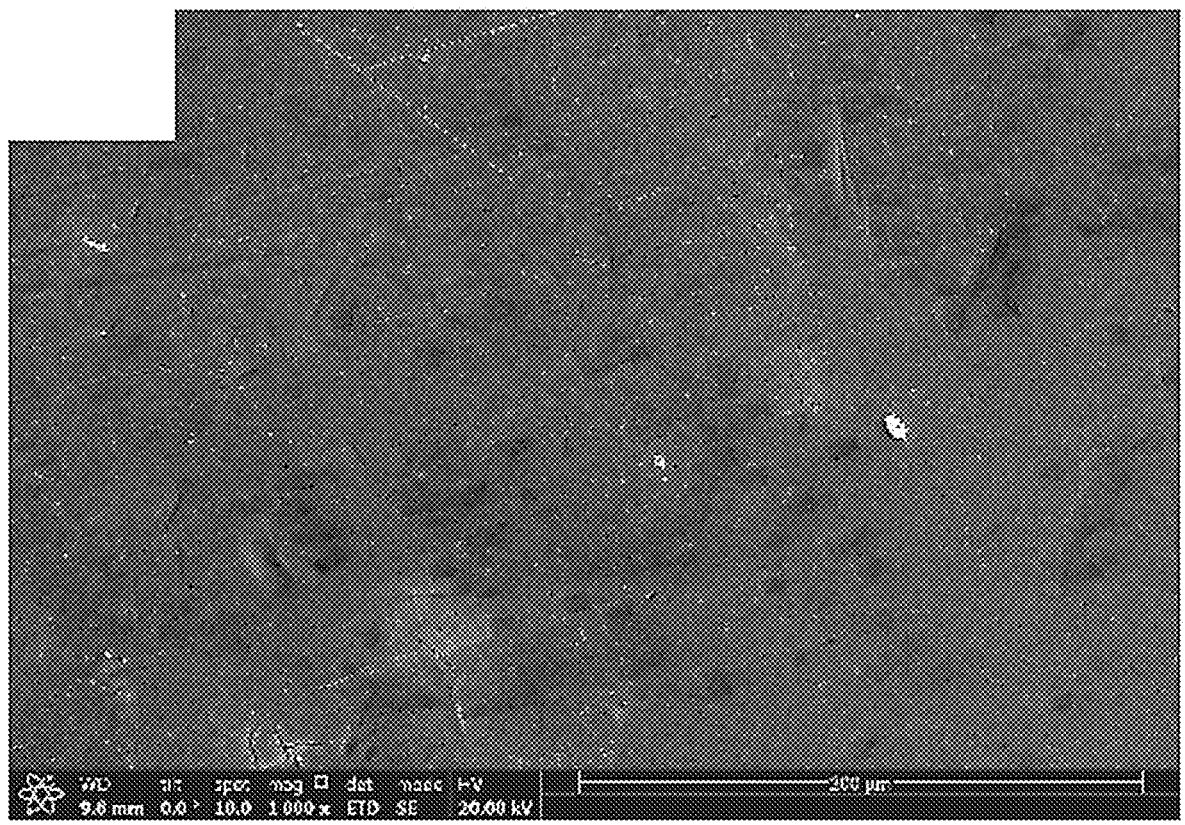
FIGS. 5A and 5B show the SEM images of the surface of a dense layer (5A) and the surface of a porous layer (5B) of a PEM asymmetric electrolyte membrane for a water electrolysis apparatus manufactured in an exemplary embodiment of the present disclosure. The SEM images of the asymmetric electrolyte membrane manufactured in an exemplary embodiment of the present disclosure were obtained after acid treatment. As a result of the observation of the surface of the porous layer (B), a pore size was confirmed to be 5-10 μm.
Figure 5B:
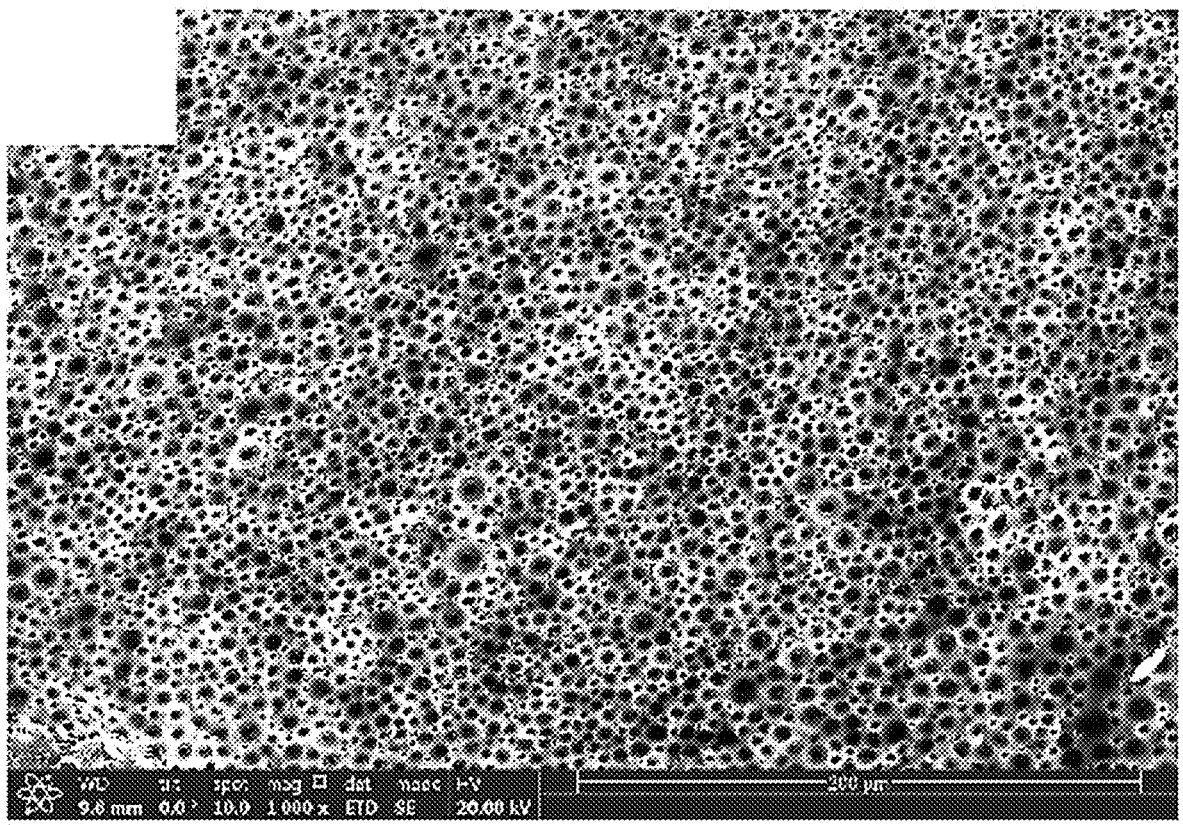

FIGS. 5A and 5B show the SEM images of the surface of the dense layer (5A) and the surface of the porous layer (5B) of the PEM asymmetric electrolyte membrane for a water electrolysis apparatus prepared in this example. The SEM images were obtained after the pretreatment. As a result of the observation of the surface of the porous layer (5B), a pore size was confirmed to be 5-10 µm.

Preparation of Membrane Electrode Assembly for PEM Water Electrolysis

In order to investigate the water electrolysis performance of the Nafion® 117 single membrane, the Nafion® asymmetric electrolyte membrane and the Nafion® re-casting membrane prepared with the same thickness, a membrane electrode assembly was prepared by the catalyst-coated membrane (CCM) method of spraying a catalyst directly onto the electrolyte membrane.

Specifically, the membrane electrode assembly was prepared by spraying $IrO_2$ as an anode catalyst and Pt/C as a cathode catalyst with a loading amount of 1 mg/cm$^2$ and 0.8 mg/cm$^2$, respectively, onto each of the Nafion® 117 single membrane, the Nafion asymmetric electrolyte membrane and the Nafion re-casting membrane with the same thickness of 180 μm.

For the Nafion 117 single membrane and the re-casting membrane, catalyst spraying was possible regardless of the direction of the membrane. However, for the asymmetric membrane of the present disclosure, care was taken for the direction such that the anode catalyst $IrO_2$ was coated on the porous layer of the surface and the cathode catalyst Pt/C was coated on the dense layer.

The composition of the spray solution was [$IrO_2$ anode catalyst/Nafion 5 wt. % ionomer/water/isopropyl alcohol=1: 5:6:24 (wt./wt./wt./wt.)] for the anode and [Pt/C cathode catalyst/Nafion 5 wt. % ionomer/water/isopropyl alcohol=1: 8.57:6:24 (wt./wt./wt./wt.)] for the cathode. An electrode was prepared by coating the catalyst on the electrolyte membrane using a hand spray.

As a result of BET measurement, the pore volume of the Nafion® 117 and the re-casting single membrane having a dense layer only was 0.0036 $cm^3/g$ and 0.0010 $cm^3/g$, respectively. In contrast, the asymmetric membrane according to an exemplary embodiment of the present disclosure, consisting of a porous layer and a dense layer, showed a relatively large pore volume of 0.051 $cm^3/g$.

As a result of measuring the porosity of the asymmetric membrane for PEM water electrolysis using a mercury porosimeter, the average pore size of the porous layer was measured to be about 5-10 μm and the porosity was in the range of 60-80%. The dense layer had a sub-angstrom (Å) average pore size (angstrom (Å) or less), which means that the dense layer is almost without pores and only ions can pass therethrough.

Application to PEM Water Electrolysis System

Figure 13A:
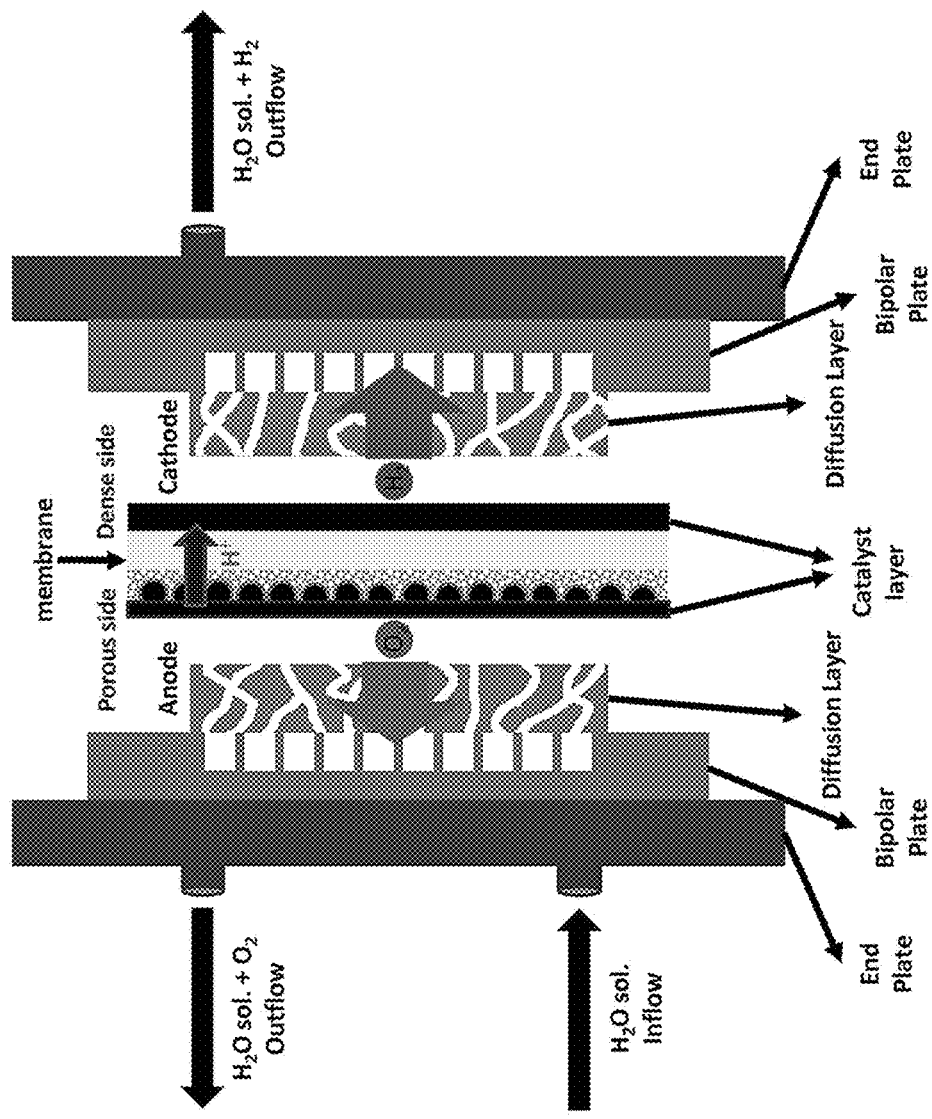
FIGS. 13A and 13B schematically shows the structure of a PEM water electrolysis apparatus (13A) and an AEM water electrolysis apparatus (13B) including an asymmetric electrolyte membrane for a water electrolysis apparatus according to an exemplary embodiment of the present disclosure.

Referring to FIG. 13A, PEM water electrolysis was conducted by using Ti at the anode side and using a graphite bipolar plate at the cathode side. Ti-felt was used as a gas diffusion layer at the anode side of the electrode, and heat treatment was carried out in an oxalic acid aqueous solution at 60° C. for 30 minutes before application to a water electrolysis system. Carbon paper was used as a gas diffusion layer at the cathode side, and a membrane electrode assembly (MEA) was assembled by inserting 340 μM gaskets on both sides of the electrode.

A single cell test was conducted to evaluate performance for application to a water electrolysis system. The single cell test was conducted under a dry cathode condition, with a cell temperature of 80° C., the temperature of the deionized water electrolyte at the anode side introduced into the cell of 85° C., and a supply rate of 20 mL/min.

Figure 9:
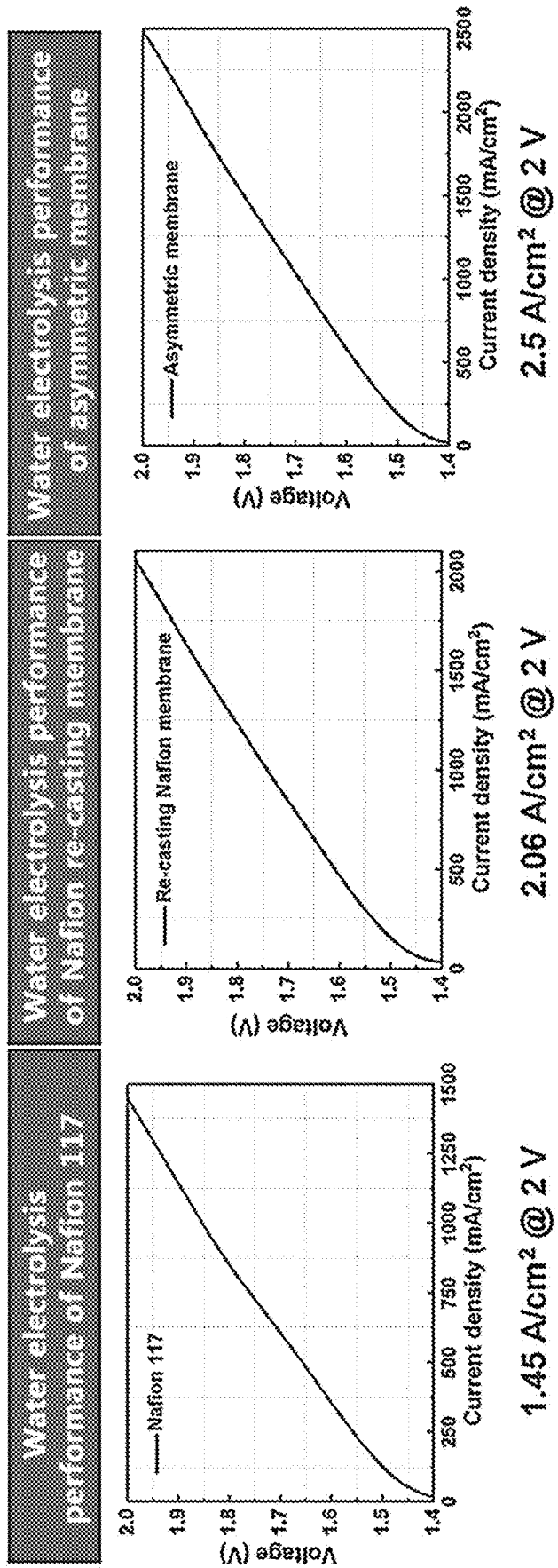
FIG. 9 compares the performance of a PEM asymmetric electrolyte membrane for a water electrolysis apparatus manufactured in an exemplary embodiment of the present disclosure with an existing commercially available Nafion® 117 membrane and a re-casting single membrane.

Referring to FIG. 9, it can be seen that superior performance can be achieved by using the asymmetric electrolyte membrane of the present disclosure as compared to the existing commercially available Nafion® 117 membrane or the re-casting single membrane.

Figure 11:
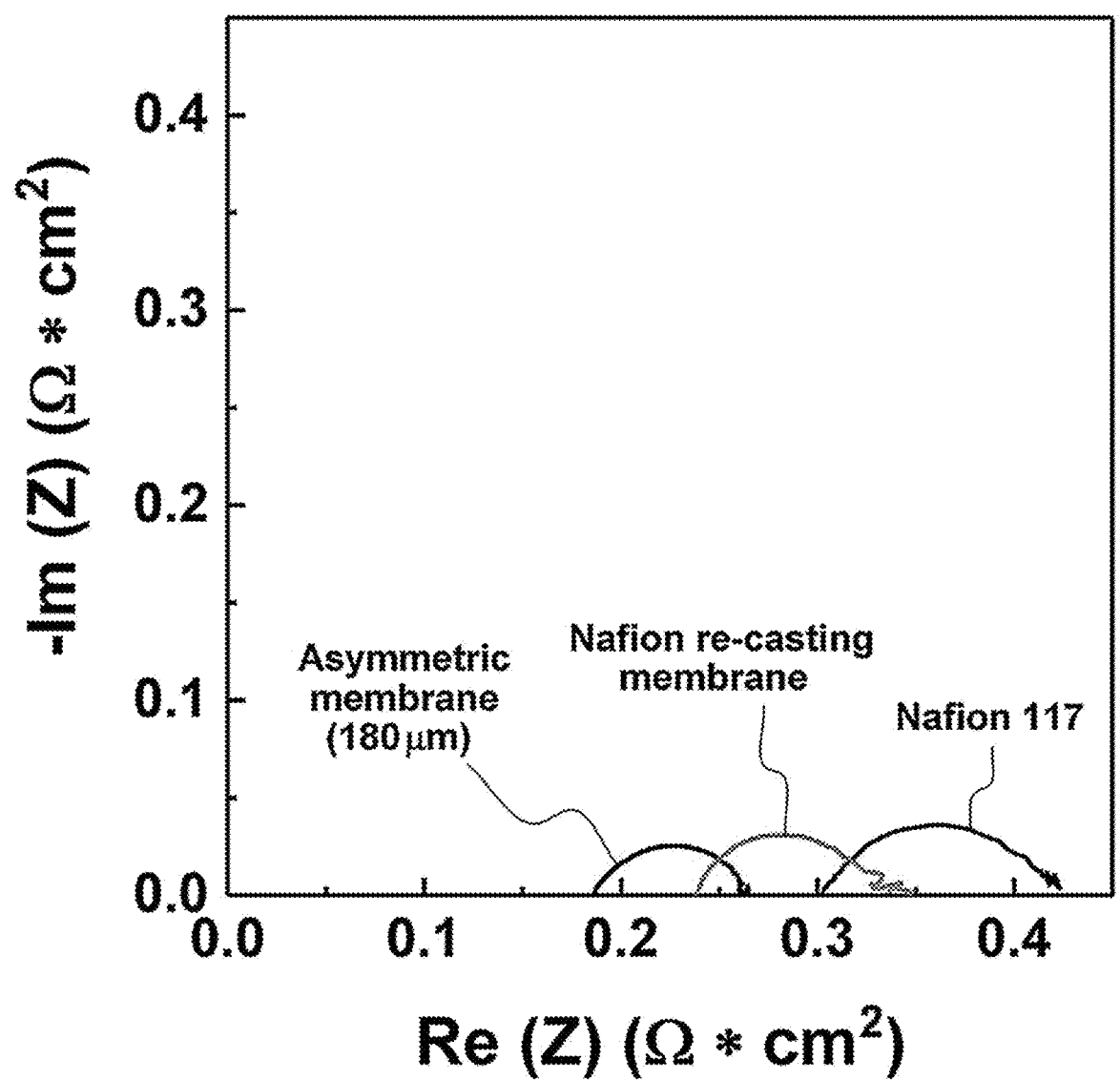
FIG. 11 compares the mass transfer resistance and ohmic resistance of a PEM asymmetric electrolyte membrane for a water electrolysis apparatus manufactured in an exemplary embodiment of the present disclosure with Nafion® 117 and a re-casting single membrane.

Referring to FIG. 11, it can be seen that the asymmetric membrane shows lower mass transfer resistance and ohmic resistance than the Nafion® 117 or the re-casting single membrane due to the porous structure. FIG. 11 shows that superior water electrolysis performance is achieved with the asymmetric membrane (abscissa: from 0.187 to 0.265, ordinate: 0.0272) than the Nafion® 117 (abscissa: from 0.302 to 0.418, ordinate: 0.0382) and the re-casting single membrane (abscissa: from 0.238 to 0.348, ordinate: 0.0327).

Preparation of Asymmetric Membrane for AEM Water Electrolysis 1 (AEM-1)

An asymmetric membrane with a thickness of 80 μm as the single membrane was prepared using an electrolyte membrane mTPN1-TMA single membrane for AEM water electrolysis.

Specifically, after adding an mTPN1-TMA single membrane (EW: 458.72, IEC: 2.18 mequiv.$g^{-1}$) to the organic solvent dimethylacetamide at 1.5 wt. %, a uniform mixture solution was prepared by stirring in an oil bath at 50° C. for 24 hours. After adding 300 wt. % of dibutyl phthalate to the mTPN1-TMA dispersion [1 wt. % mTPN1-TMA, 99 wt. % dimethylacetamide] based on the content of the mTPN1-TMA polymer and stirring for 12 hours, a uniform casting solution was prepared by deaeration.

Subsequently, the casting solution was coated on a glass substrate with a doctor blade. After coating the casting solution on a glass plate, the solvent was evaporated at 60° C. for 12 hours, and dried further at 80° C. for 2 hours, at 100° C. in vacuo for 2 hours, at 120° C. in vacuo for 2 hours and at 140° C. in vacuo for 2 hours. Due to the solvent evaporation, phase separation occurred between the mTPN1-TMA and the dibutyl phthalate nonsolvent and the dibutyl phthalate was settled down before the mTPN1-TMA was solidified due to the difference in density (see FIG. 2). The dried hydrocarbon-based asymmetric electrolyte membrane for AEM water electrolysis was immersed in methanol as a solvent for extracting the nonsolvent at room temperature for 2 hours and then a porous layer was formed by removing the dibutyl phthalate nonsolvent remaining in the porous layer.

Through this procedure, a hydrocarbon-based asymmetric electrolyte membrane for AEM water electrolysis having a dense layer on the surface and a porous layer in the lower part was prepared For a re-casting membrane, casting and solvent evaporation were conducted under the same condition as the asymmetric membrane. The re-casting membrane was prepared in the same manner as the asymmetric membrane without using the dibutyl phthalate nonsolvent.

As a result of observing the finally prepared electrolyte membranes, the mTPN1-TMA re-casting membrane was transparent whereas the asymmetric membrane of the present disclosure looked whitish and opaque. The opaque membrane seems to be due to the formation of the porous layer.

Preparation of Asymmetric Membrane for AEM Water Electrolysis 2 (AEM-2)

An asymmetric membrane was prepared by utilizing phase transition of a polymer solution caused by the diffusion of a nonsolvent. The asymmetric membrane was prepared with a thickness of 80 nm using an mTPN1-TMA electrolyte membrane for AEM water electrolysis.

After preparing an electrolyte membrane of a dense structure through casting, an asymmetric membrane was prepared by forming a porous layer on the prepared dense layer.

In order to prepare the electrolyte membrane of the dense structure, 10 wt. % of an mTPN1-TMA single membrane (EW: 458.72, IEC: 2.18 mequiv.$g^{-1}$) was added to dimethylacetamide as an organic solvent and then a uniform casting solution was prepared by stirring in an oil bath at 80° C. for 24 hours. The mTPN1-TMA casting solution [10 wt. % mTPN1-TMA, 90 wt. % dimethylacetamide] was prepared through deaeration (first casting solution).

Subsequently, the first casting solution was cast on a glass substrate with a doctor blade. After coating the casting solution on a glass plate and evaporating the solvent at 60° C. for 12 hours, an electrolyte membrane of a dense structure was prepared by further drying at 80° C. for 2 hours, at 100° C. in vacuo for 2 hours, at 120° C. in vacuo for 2 hours, and at 140° C. in vacuo for 2 hours.

Then, a casting solution [5 wt. % mTPN1-TMA, 95 wt. % dimethylacetamide] in which an mTPN1-TMA single membrane (EW: 458.72, IEC: 2.18 mequiv.g$^{-1}$) was diluted to 5 wt. % or lower with dimethylacetamide as an organic solvent was cast on the electrolyte membrane for AEM water electrolysis with a doctor blade (second casting solution). After coating the casting solution on a glass plate, the plate was immersed in deionized water as a nonsolvent within 1 minute at 15-30° C., for at least 12 hours.

The prepared asymmetric membrane was removed from the glass substrate using a 1 M KOH solution and then washed with and stored in deionized water.

Pretreatment of Electrolyte Membrane for AEM Water Electrolysis

Both the mTPN1-TMA re-casting single membrane and the asymmetric membrane were treated with a base under the same condition. The electrolyte membrane, which had been stored in deionized water at room temperature was immersed in a 1 M KOH aqueous solution for at least 3 hours and the water on the surface was removed before conducting AEM water electrolysis.

Figure 6A:
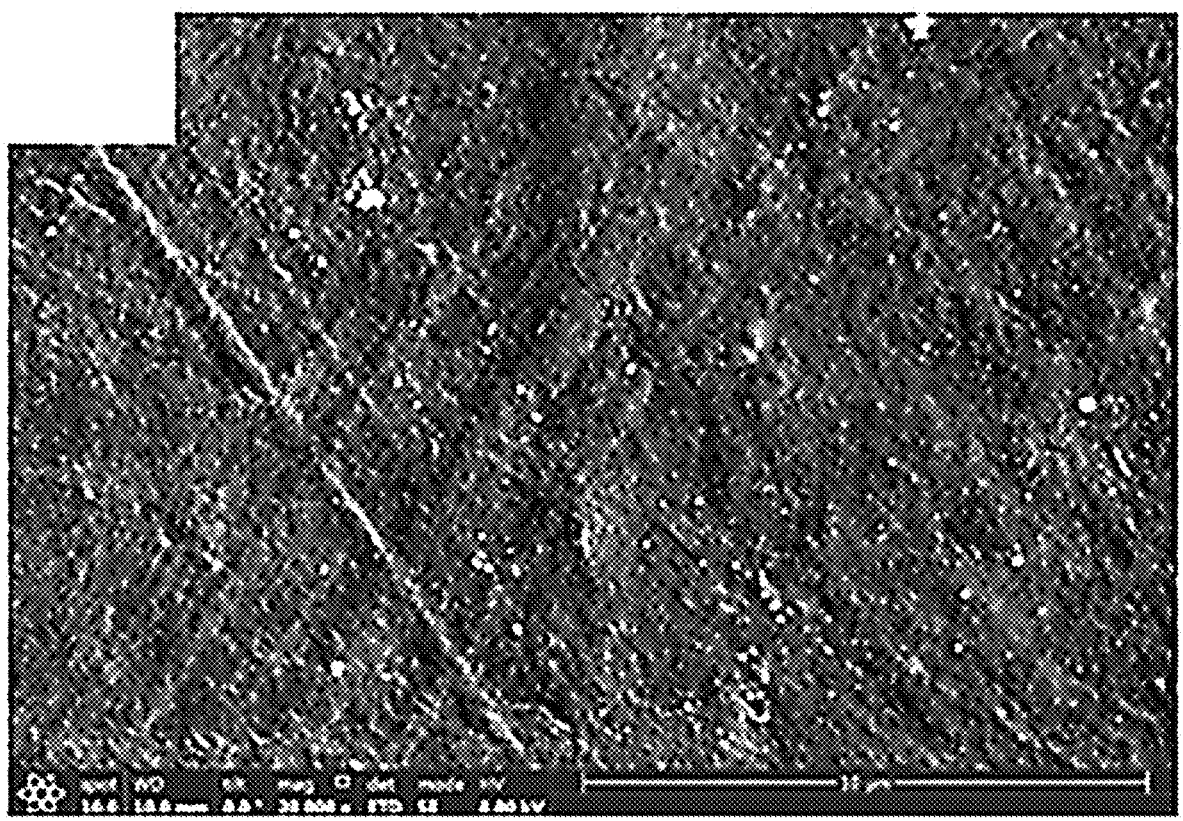
FIGS. 6A and 6B show the SEM images of the surface of a dense layer (6A) and the surface of a porous layer (6B) of an AEM asymmetric electrolyte membrane for a water electrolysis apparatus manufactured in an exemplary embodiment of the present disclosure. The SEM images of the asymmetric electrolyte membrane manufactured in an exemplary embodiment of the present disclosure were obtained after base treatment. As a result of the observation of the surface of the porous layer, a pore size was confirmed to be 5-10 μm.
Figure 6B:
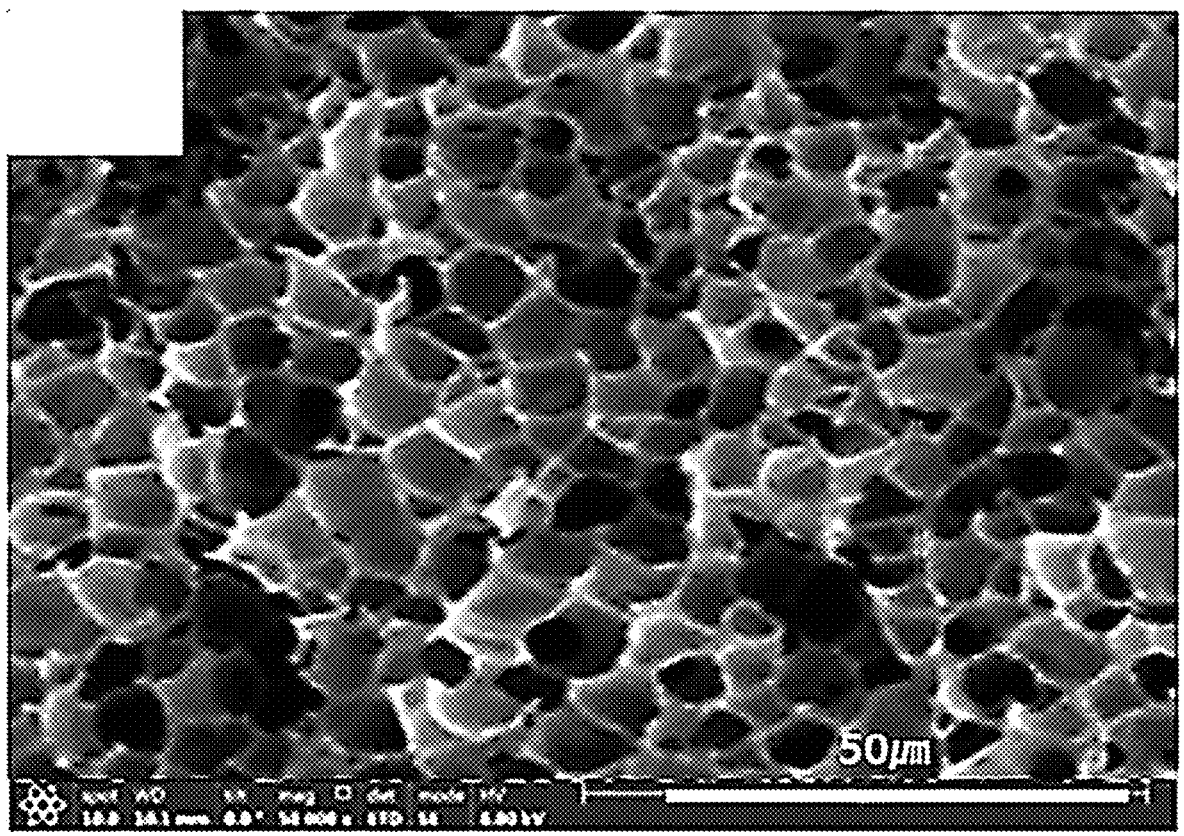

FIGS. 6A and 6B show the SEM images of the surface of the dense layer (6A) and the surface of the porous layer (6B) of the AEM asymmetric electrolyte membrane for a water electrolysis apparatus prepared in this example. The SEM images were obtained after base treatment. As a result of the observation of the surface of the porous layer, a pore size was confirmed to be 5-10 μm. The dense layer had a sub-angstrom (Å) average pore size, which means that the dense layer is almost without pores and only ions can pass therethrough.

Preparation of Membrane Electrode Assembly for AEM Water Electrolysis

In order to investigate the water electrolysis performance of the asymmetric electrolyte membrane prepared with the same thickness as the mTPN1-TMA re-casting single membrane, a membrane electrode assembly was prepared by the catalyst-coated substrate (CCS) method of spraying a catalyst on a gas diffusion layer.

Specifically, for the mTPN1-TMA re-casting single membrane and the asymmetric electrolyte membrane of the present disclosure, Ti-felt was used as an anode gas diffusion layer, and carbon paper was used as a cathode gas diffusion layer. Catalyst-coated gas diffusion layers at the anode and cathode sides were prepared by spraying IrO$_2$ as an anode catalyst onto the anode gas diffusion layer Ti-felt and spraying a cathode catalyst onto the cathode gas diffusion layer carbon paper. The loading amount was 2 mg/cm$^2$ for anode catalyst IrO$_2$, and Pt/C 0.5 mg/cm$^2$ for the cathode catalyst. A membrane electrode assembly was prepared by inserting the mTPN1-TMA re-casting single membrane or the asymmetric electrolyte membrane between the two catalyst-coated gas diffusion layers.

For the mTPN1-TMA re-casting single membrane, catalyst spraying was possible regardless of the direction of the membrane. However, for the asymmetric membrane of the present disclosure, care was taken for the direction such that the anode catalyst IrO$_2$ was coated toward the porous layer of the surface and the cathode catalyst Pt/C was coated toward the dense layer, on each gas diffusion layer.

The composition of the spray solution was [IrO$_2$ anode catalyst/QASOH (quaternary ammonium-tethered polystyrene hydroxide) 2.5 wt. % ionomer/water/isopropyl alcohol=1: 4:10:100 (wt./wt./wt.)] for the anode and [Pt/C cathode catalyst/QASOH(quaternary ammonium tethered poly (styrene) hydroxide) 2.5 wt. % ionomer/water/isopropyl alcohol=1:10:3.20:100 (wt./wt./wt./wt.)] for the cathode. An electrode was prepared by coating the catalyst on the gas diffusion layer using a hand spray.

Application to AEM Water Electrolysis System

Figure 13B:
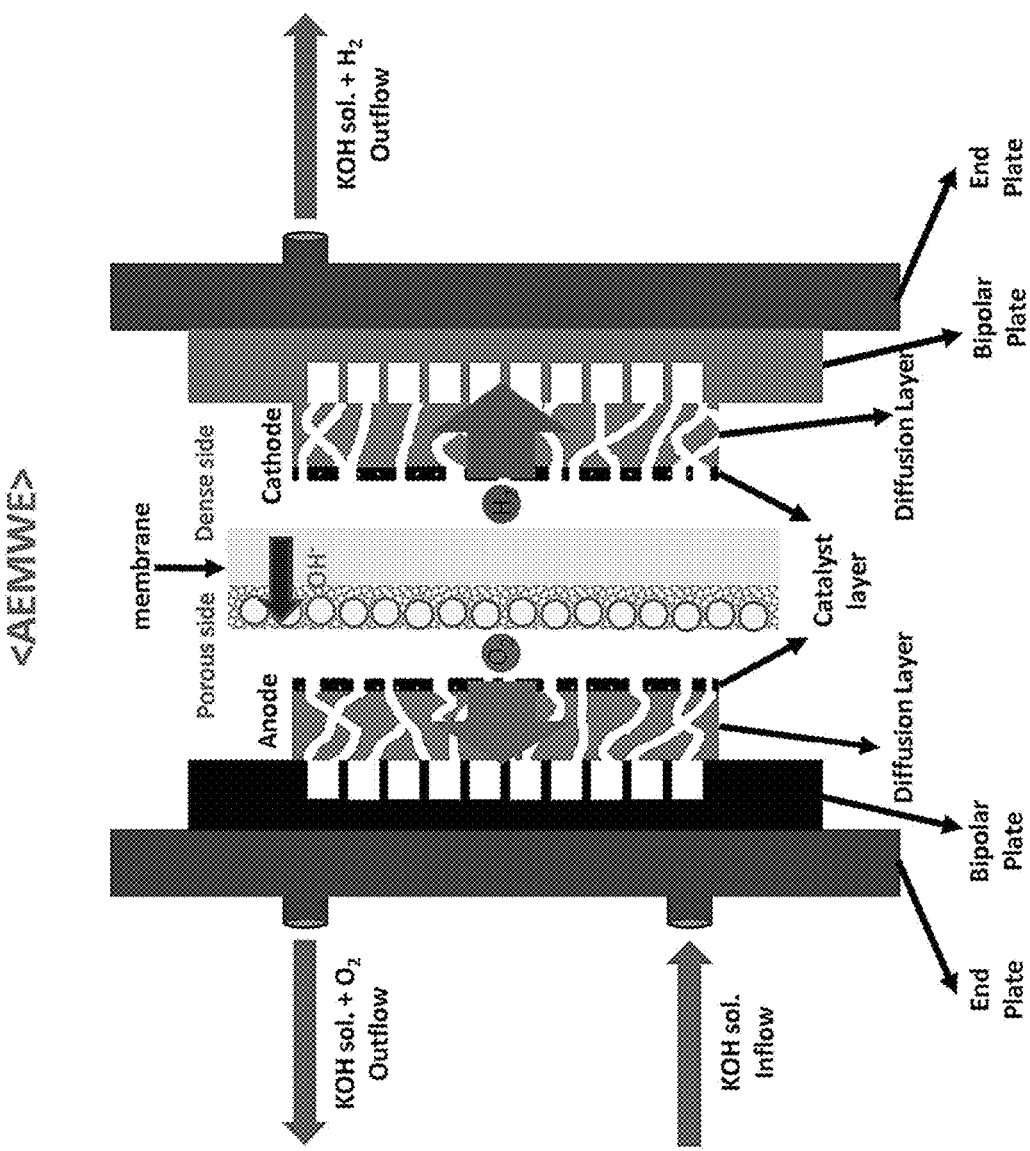

Referring to FIG. 13B, AEM water electrolysis was conducted by using gold-coated Ti at the anode side and using a graphite bipolar plate at the cathode side. Ti-felt was used as a gas diffusion layer at the anode side of the prepared electrode and carbon paper was used as a gas diffusion layer at the cathode side. A membrane electrode assembly (MEA) was assembled by inserting 240 μm gaskets on both sides of the electrode.

A single cell test was conducted to evaluate performance for application to a water electrolysis system. The single cell test was conducted under a dry cathode condition, with a cell temperature of 80° C., the temperature of 0.5 M KOH electrolyte at the anode side introduced into the cell of 85° C., and a supply rate of 5 mL/min.

Figure 10:
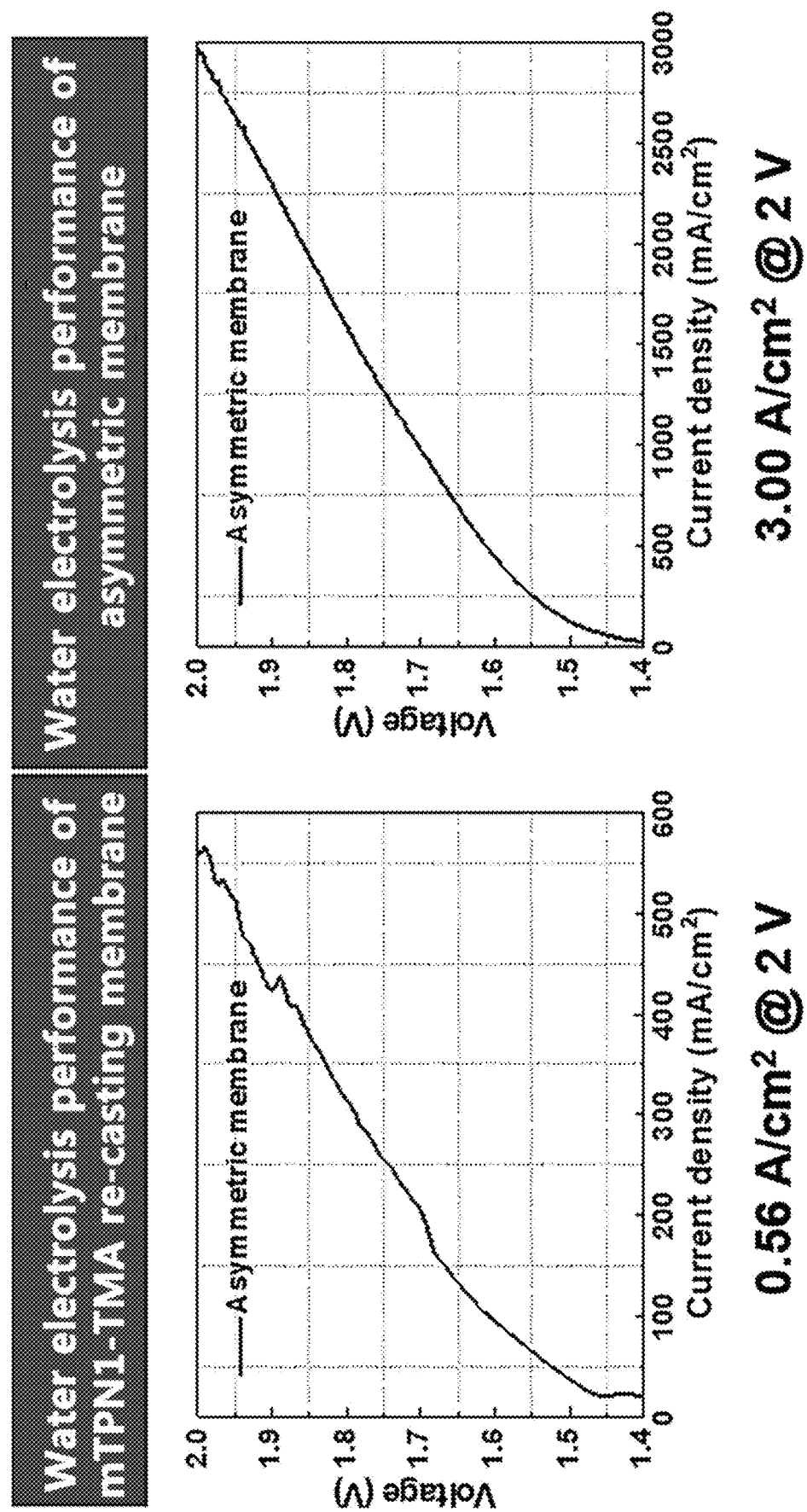
FIG. 10 compares the performance of an AEM asymmetric electrolyte membrane for a water electrolysis apparatus manufactured in an exemplary embodiment of the present disclosure with an mTPN1-TMA (Br form) single membrane.

Referring to FIG. 10, it can be seen that about 5 times superior performance can be achieved by using the asymmetric electrolyte membrane of the present disclosure as compared to the existing mTPN1-TMA re-casting single membrane.

Figure 12:
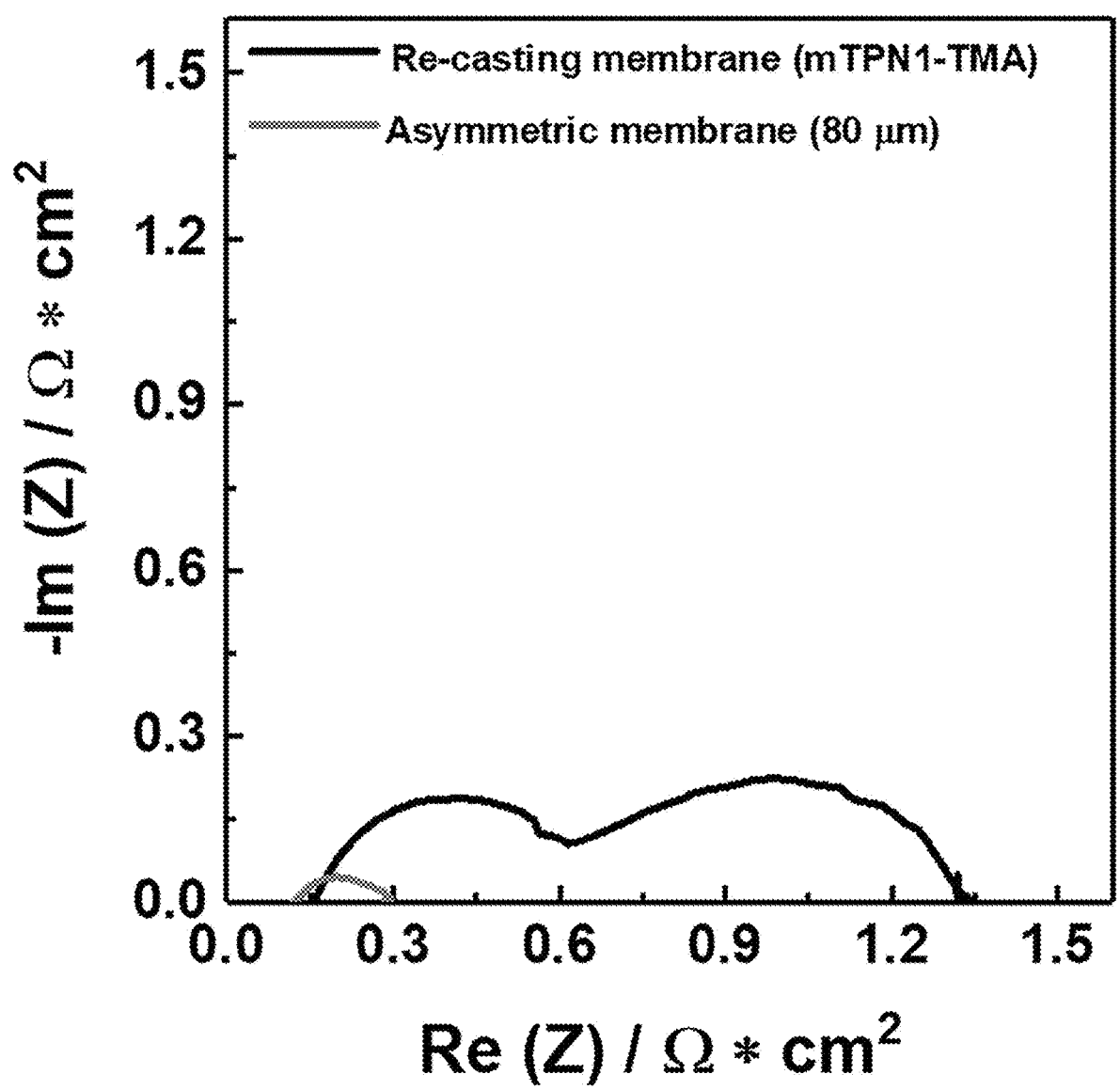
FIG. 12 compares the mass transfer resistance and ohmic resistance of an AEM asymmetric electrolyte membrane for a water electrolysis apparatus manufactured in an exemplary embodiment of the present disclosure with an mTPN1-TMA (Br form) single membrane.

Referring to FIG. 12, it can be seen that the asymmetric membrane shows lower mass transfer resistance and ohmic resistance than the mTPN1-TMA re-casting single membrane due to the porous structure. FIG. 12 shows that superior water electrolysis performance is achieved with the asymmetric membrane (abscissa: from 0.122 to 0.295, ordinate: 0.0443) than the mTPN1-TMA re-casting single membrane (abscissa: from 0.151 to 1.357, ordinate: 0.227).

The invention claimed is:

1. A membrane electrode assembly for a water electrolysis apparatus, comprising:
    an anode;
    a cathode; and
    an asymmetric electrolyte membrane located between the anode and the cathode;
    wherein the asymmetric electrolyte membrane comprises:
    a porous layer comprising a fluorine-based cation-exchange resin or a hydrocarbon-based anion-exchange resin; and
    a dense layer comprising a fluorine-based cation-exchange resin or a hydrocarbon-based anion-exchange resin;
    wherein the asymmetric electrolyte membrane is treated with one or more selected from a group consisting of an acid, hydrogen peroxide and a base;
    wherein the porous layer comprises pores;
    wherein the porous layer has a pore size of 0.5-15 μm;
    wherein the porous layer has a porosity of 60-80%;
    wherein only ions can pass through the dense layer;
    wherein the anode is provided on the porous layer; and
    wherein the cathode is provided on the dense layer.

2. The membrane electrode assembly for a water electrolysis apparatus according to claim 1, wherein the dense layer does not comprise pores.

3. The membrane electrode assembly for a water electrolysis apparatus according to claim 1, wherein
    the fluorine-based cation-exchange resin is one or more selected from a group consisting of a sulfonated tetrafluoroethylene-based fluoropolymer copolymer, a perfluorinated sulfonic acid/polytetrafluoroethylene copolymer, a perfluorosulfonic acid (PFSA) copolymer, a perfluorocarboxylic acid polymer, a perfluorosulfonic acid polymer, and a perfluorosulfonic acid ionomer dispersion, and, the hydrocarbon-based anion-exchange resin is one or more selected from a group consisting of a phenylene-based resin, a PBI (polybenzimidazole)-based resin, a PES (polyaryleneethersulfone)-based resin, a PPO (polyphenylene oxide)-based resin, a PS polystyrene-based resin, and a blend thereof.

4. The membrane electrode assembly for a water electrolysis apparatus according to claim 1, wherein the for a water electrolysis apparatus is a PEM water electrolysis apparatus.

5. The membrane electrode assembly for a water electrolysis apparatus according to claim 1, wherein the for a water electrolysis apparatus is an AEM water electrolysis apparatus.

6. The membrane electrode assembly for a water electrolysis apparatus according to claim 1, wherein
the anode comprises one or more selected from a group consisting of a precious metal-based single oxide, a precious metal-based complex oxide and a transition metal, and
the cathode comprises one or more selected from a group consisting of a precious metal-based carbon support and a transition metal.

7. The membrane electrode assembly for a water electrolysis apparatus according to claim 1, wherein the pore size in the porous layer is 5-10 μm.

8. A water electrolysis apparatus comprising the membrane electrode assembly for a water electrolysis apparatus according to claim 1.

9. A method for manufacturing the asymmetric electrolyte membrane for a water electrolysis apparatus according to claim 1, comprising:
a step of coating a casting solution comprising a fluorine-based cation-exchange resin or a hydrocarbon-based anion-exchange resin, a solvent and a nonsolvent on a substrate;
a step of removing a solvent from a cast membrane; and
a step of removing the nonsolvent from the membrane with the solvent removed.

10. The method for manufacturing the asymmetric electrolyte membrane for a water electrolysis apparatus according to claim 9, wherein
the method is a method for manufacturing an asymmetric electrolyte membrane for a PEM water electrolysis apparatus,
the solvent is one or more selected from a group consisting of water, methanol, ethanol and propanol, and
the nonsolvent is one or more selected from a group consisting of ortho-dichlorobenzene, meta-dichlorobenzene, para-dichlorobenzene, naphthalene and alpha-naphthol.

11. The method for manufacturing the asymmetric electrolyte membrane for a water electrolysis apparatus according to claim 9, wherein
the method is a method for manufacturing an asymmetric electrolyte membrane for an AEM water electrolysis apparatus,
the solvent is one or more selected from a group consisting of dimethylformamide, dimethylacetamide, dimethyl sulfoxide and methylpyrrolidone, and
the nonsolvent is one or more selected from a group consisting of polyethylene glycol, polyvinylpyrrolidone, stearyl alcohol, bean oil, glycerol and dibutyl phthalate.

12. The method for manufacturing the asymmetric electrolyte membrane for a water electrolysis apparatus according to claim 9, wherein the method further comprises,
after the step of removing the nonsolvent,
a step of treating the membrane with one or more selected from a group consisting of an acid, hydrogen peroxide and a base.

13. A method for manufacturing a membrane electrode assembly for a water electrolysis apparatus, comprising:
a step of manufacturing an asymmetric electrolyte membrane for a water electrolysis apparatus according to the method according to claim 9;
a step of forming an anode on a porous layer of the asymmetric electrolyte membrane for a water electrolysis apparatus; and
a step of forming a cathode on a dense layer of the asymmetric electrolyte membrane for a water electrolysis apparatus.

14. A method for manufacturing the asymmetric electrolyte membrane for a water electrolysis apparatus according to claim 1, comprising:
a step of coating a first casting solution comprising a hydrocarbon-based anion-exchange resin and a solvent on a substrate;
a step of forming a dense layer by removing the solvent from a cast membrane;
a step of coating a second casting solution comprising a hydrocarbon-based anion-exchange resin and a solvent on the dense layer; and
a step of forming a porous layer by immersing the membrane with the second casting solution coated in a nonsolvent.

15. The method for manufacturing the asymmetric electrolyte membrane for a water electrolysis apparatus according to claim 14, wherein
the method is a method for manufacturing an asymmetric electrolyte membrane for an AEM water electrolysis apparatus,
the solvent is one or more selected from a group consisting of dimethylformamide, dimethylacetamide, dimethyl sulfoxide and methylpyrrolidone, and
the nonsolvent is one or more selected from a group consisting of water, an alcohol, polyvinylpyrrolidone, polyethylene glycol and glycerol.

* * * * *